(12) United States Patent
Chen et al.

(10) Patent No.: US 9,538,019 B2
(45) Date of Patent: *Jan. 3, 2017

(54) PROACTIVE CREATION OF PHOTO PRODUCTS

(71) Applicant: Shutterfly, Inc., Redwood City, CA (US)

(72) Inventors: Eugene Chen, Belmont, CA (US); Preeti Nathan, San Carlos, CA (US); Trynne Anne Miller, San Francisco, CA (US); Wiley H. Wang, Pacifica, CA (US)

(73) Assignee: Shutterfly, Inc., Redwood City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/468,582

(22) Filed: Aug. 26, 2014

(65) Prior Publication Data

US 2014/0363042 A1    Dec. 11, 2014

Related U.S. Application Data

(63) Continuation of application No. 13/732,580, filed on Jan. 2, 2013, now Pat. No. 8,848,972, which is a continuation of application No. 12/729,466, filed on Mar. 23, 2010, now Pat. No. 8,363,888, which is a continuation-in-part of application No. 12/406,873, filed on Mar. 18, 2009, now Pat. No. 8,131,114.

(51) Int. Cl.
*G06K 9/00* (2006.01)
*H04N 1/00* (2006.01)
*G06F 17/21* (2006.01)
*G09G 5/14* (2006.01)
*H04N 101/00* (2006.01)

(52) U.S. Cl.
CPC ........ *H04N 1/00132* (2013.01); *G06F 17/212* (2013.01); *G09G 5/14* (2013.01); *H04N 1/00167* (2013.01); *H04N 1/00196* (2013.01); *H04N 1/00442* (2013.01); *H04N 1/00453* (2013.01); *H04N 1/00456* (2013.01); *H04N 1/00458* (2013.01); *H04N 1/00461* (2013.01); *H04N 2101/00* (2013.01)

(58) Field of Classification Search
USPC ........................................... 382/100; 715/273
See application file for complete search history.

(56) References Cited

U.S. PATENT DOCUMENTS 7,289,132 B1    10/2007   Reid
8,131,114 B2 *   3/2012   Wang ................. H04N 1/00132
                                                   358/1.18

(Continued)

*Primary Examiner* — John Strege
(74) *Attorney, Agent, or Firm* — Xin Wen

(57) ABSTRACT

A method for proactively creating a photobook includes identifying a group of images by a computer system and automatically creating a design for a photobook by the computer system without receiving a user's request for designing a photobook if the number of images in the group is determined to be within a predetermined range. Pages of the photobook incorporate a plurality of images in the group. The method further includes presenting the design of the photobook to a user for preview and receiving an order from the user for a physical manifestation of the photobook based on the design.

25 Claims, 11 Drawing Sheets

(56) References Cited

U.S. PATENT DOCUMENTS

| | | | |
|---|---|---|---|
| 8,363,888 B2* | 1/2013 | Chen | H04N 1/00132 382/100 |
| 8,437,575 B2* | 5/2013 | Chen | H04N 1/00132 382/284 |
| 8,848,972 B2* | 9/2014 | Chen | H04N 1/00132 382/100 |
| 2004/0032599 A1 | 2/2004 | Atkins | |

* cited by examiner

PROACTIVE CREATION OF PHOTO PRODUCTS

TECHNICAL FIELD

This application relates to utilization of digital images, and more specifically, to the design and creation of products based on digital images.

BACKGROUND OF THE INVENTION

In recent years, photography has been rapidly transformed from chemical based technologies to digital imaging technologies. Images captured by digital cameras can be stored in computers and viewed on display devices. Users can also produce image prints based on the digital images. Such image prints can be generated locally using output devices such an inkjet printer or a dye sublimation printer or remotely by a photo printing service provider. Other products that can be produced using the digital images can include photo books, photo calendars, photo mug, photo T-shirt, and so on. A photo book can include a cover page and a plurality of image pages each containing one or more images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming. It is desirable to provide methods to allow users to design and produce photo albums in a time efficient manner.

SUMMARY OF THE INVENTION

The disclosed methods and systems can significant increase the awareness of users in personalized image products such as photobooks. A user can also be given a chance to learn and visualize what a photobook might look like before he or she realizes that the possibility of a photobook or a photobook design based on his or her images. The memories of the users can thus be better preserved in more colorful and tangible ways for the users.

Furthermore, the disclosed systems and methods provide more convenient ways for a user to obtain designs of photo books. Images in a group can be automatically arranged into a photobook design without being asked by a user. The user is provided with an option to review, to edit, and to request a photobook to be made according to the design. As a result, the time and effort for a user to obtain a photobook are significantly reduced.

In one general aspect, the present invention relates to a method for proactively creating a photobook. The method includes identifying a group of images by a computer system; automatically creating a design for a photobook by the computer system without receiving a user's request for designing a photobook if the number of images in the group is determined to be within a predetermined range, wherein pages of the photobook incorporate a plurality of images in the group; presenting the design of the photobook to a user for preview; and receiving an order from the user for a physical manifestation of the photobook based on the design.

Implementations of the system may include one or more of the following. The group of images can be received in an upload from a computer device to the computer system. The group of images can be formed in an electronic share from a first user to a second user. The group of images can be clustered when they are selected for printing. The group of images can be clustered when the images are placed in an electronic folder or an electronic album. The group of images can be tagged by a common label. The method can further include automatically selecting a format or a style for the design of the photobook before the step of automatically creating a design for a photobook by a computer system. The method can further include determining if the number of images in the group is determined to be within a predetermined range, wherein the predetermined range varies depending on if the group of the images is clustered in an upload from a computer device to the computer system, or when the images are selected for printing, or when the images are placed in an electronic folder or an electronic album, or when the images are placed in an electronic folder or an electronic album, or the images are tagged by a common label. The step of automatically creating a design for a photobook can include assigning at least a portion of the plurality of images into a first page group and a second page group each comprising one or more images; placing the first page group of one or more images in the first page of the photobook; and placing the second page group of one or more images in the second page of the photobook. The step of automatically creating a design for a photobook can further include automatically selecting a first page layout from a library of page layouts, wherein the first page group of one or more images are placed in the first page according to the first page layout; and automatically selecting a second page layout from the library of page layouts, wherein the second page group of one or more images are placed in the second page according to the second page layout. At least two of the plurality of images can be separated into the first page group and the second page group based on capture times of the two images. The two images can be placed on a same page if the two images were captured within a predetermined period of time. The two images can be placed on a different page if the two images were captured within a predetermined period of time. At least two of the plurality of images can be separated into the first page group and the second page group based on color content of the two images. The two images can be placed on a same page if popular colors in the two images are within a predetermined distance in a color space. The two images can be placed on a different page if popular colors in the two images are within a predetermined distance in a color space. At least two of the plurality of images can be separated into the first page group and the second page group based on image-capture locations of the two images. The method can further include allowing the user to remove at least one image from the first page or to move an image from the first page to the second page after the step of presenting the design of the photobook. The method can further include allowing the user to select the format or the style for the design of the photobook page after the step of presenting the design of the photobook. The method can further include making the physical manifestation of the photobook in accordance to the design. The step of presenting the design of the photobook to a user for preview can include sending an email message to the user to present the design of the photobook.

In another general aspect, the present invention relates to a method for proactively creating a photobook. The method includes identifying a group of images by a computer system; automatically selecting a format and a style for a photobook by the computer system if the number of images in the group is determined to be within a predetermined range; automatically creating a design for the photobook in the selected format and the style by the computer system without receiving a user's request for designing a photobook using the group of images, wherein pages of the photobook incorporates a plurality of images in the group; presenting the design of the photobook to a user for preview; and receiving an order from the user for a physical manifestation of the photobook based on the design.

In another general aspect, the present invention relates to a method for proactively creating a photobook. The method includes identifying a group of images by a computer system; automatically creating a design for a photobook by the computer system without receiving a user's request for designing a photobook if the number of images in the group is determined to be within a predetermined range, wherein pages of the photobook incorporate a plurality of images in the group; presenting the first design of the photobook to a user for preview; detecting a change in the group of images; automatically modifying the first design of photobook to create a second design for the photobook in response to the change in the group of images; and presenting the second design of the photobook to a user for preview.

Implementations of the system may include one or more of the following. The change in the group of images can include addition to the group of images or removal of images from the group of images. The change in the group of images can include a change in an image property of the group of images. The image property can include a tag, a keyword, a title of a folder where the images are placed, or metadata at least one of the images.

BRIEF DESCRIPTIONS OF THE DRAWINGS

The accompanying drawing, which are incorporated in and form a part of this specification, illustrate embodiments of the invention and, together with the description, serve to explain the principles of the invention:

DETAILED DESCRIPTION OF THE INVENTION

In the present invention, the term "photo album" refers to a book that includes one or two cover pages and one or more image pages. Each of the image pages can include one or more images. The image pages can also include text or image caption. The image layout can also include a background pattern. In the imaging industry, photo albums can include photo books, scrapbooks, snap books, and any books form including bound image pages.

Figure 1:
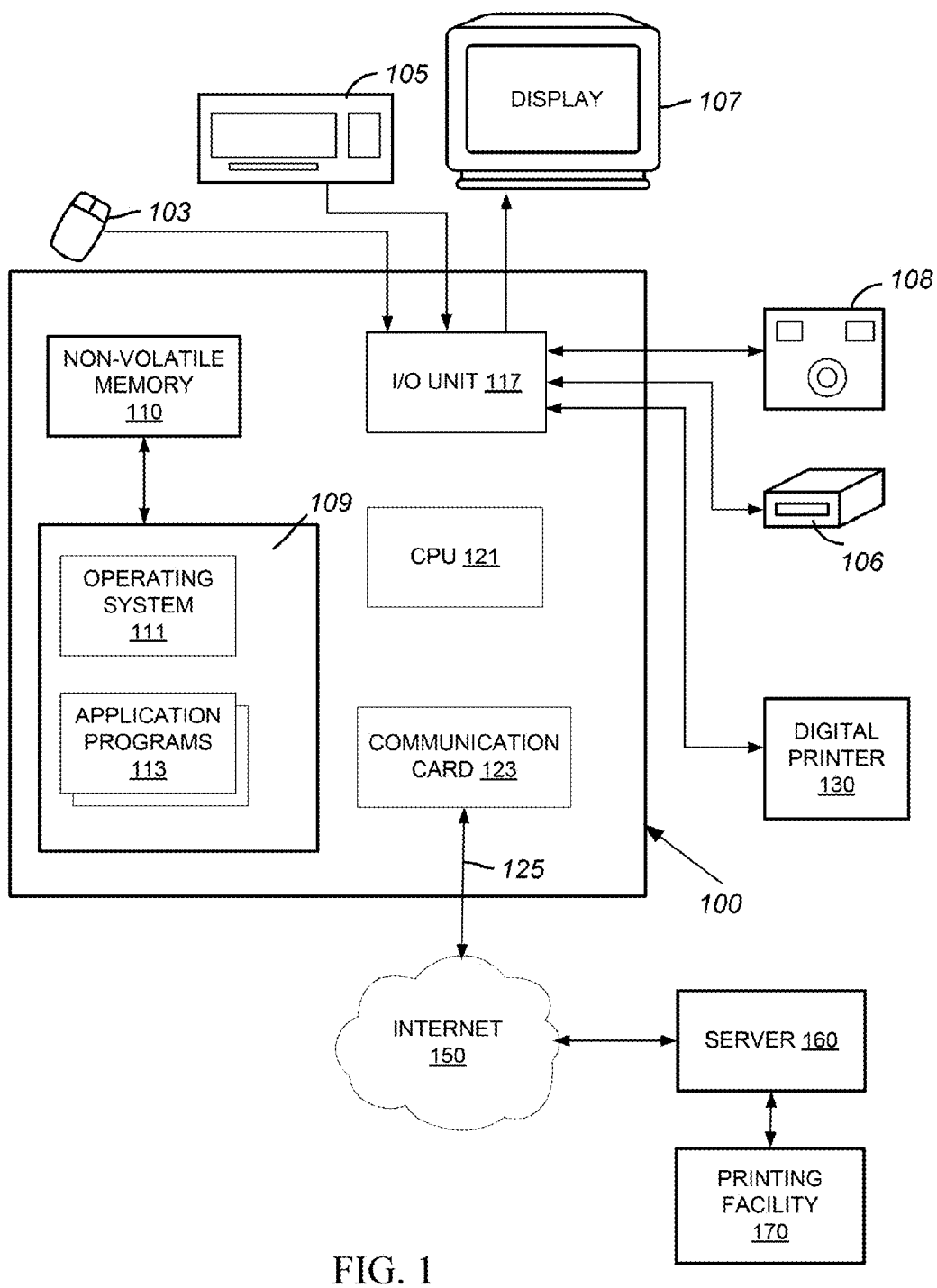
FIG. 1 is a block diagram of a system for imaging applications compatible with the present invention.

A computer 100 illustrated in FIG. 1 represents an exemplified hardware setup for executing software that allows a user to perform tasks such as communicating with other computer users, accessing various computer resources, and viewing, creating, or otherwise manipulating electronic content, that is, any combination of text, images, movies, music or other sounds, animations, 3D virtual worlds, and links to other objects. The system includes various input/output (I/O) devices (mouse 103, keyboard 105, display 107) and a computer 100 having a central processor unit (CPU) 121, an I/O unit 117 and a memory 109 that stores data and various programs such as an operating system 111, and one or more application programs 113. The computer 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 such as a cable modem, DSL service or wireless Internet connection. The computer 100 of FIG. 1 also can be connected to various peripheral I/O devices. One of the more popular of such peripheral devices is a digital camera 108. The digital camera 108 enables users to take pictures (i.e., images), which are saved in memory within the digital camera 108 in a digital format. After taking and storing the images, the user can connect the digital camera 108 to a computer 100 in order to upload the digital images to the computer's disk drive or other non-volatile memory 110. The user can also wirelessly transfer digital images in the digital camera to the computer 100. Once the digital images are uploaded to the computer 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110. Once the digital images are stored on the computer 100, a user can perform various operations on them. For example, an image viewer application can be used to view the images. A photo editing application can also be used to touch-up or otherwise modify the images. The computer 100 can communicate via Internet 150 with a server 160 provided by a service provider, such as Shutterfly, Inc. A user operating the computer 100 can upload or download images between the computer and the server 160. The user can also electronically share his or her images facilitated by the service provider.

It should be noted that the computer 100 can exist in other configurations from the example shown in FIG. 1 and described above. The computer can include a mobile device such as a smart phone, a wireless enabled mobile computer such as a laptop computer or a tablet computer.

Although large numbers of images are frequently captured by digital cameras, people often are not aware of the types of customized digital enabled imaging products that are available from image service providers such as Shutterfly, Inc. Customizable image products can include photobooks, photo calendars, photo greeting cards, photo stationeries, photo mugs, photo T-shirt, and so on, which can provide significant enhanced ways for preserving people's treasured memories in addition to viewing images on electronic displays.

Additionally, significant obstacles exist even for people who are aware of the availability of customizable image products. The design of a photobook, for example, can take significant amount of time and effort. A user has to select photos for many pages including a cover page. The user needs to select a format, and a style for the photobook. The user needs to design or select layout for each page, sort images for different pages, and place images onto individual pages. The photobook design can take many iterative steps such as selecting suitable images, selecting layout, selecting images for each page, add text, which can often take hours to complete.

Once the user approves a design, the photobook can be made according to the design locally by a printer 130 connected to the computer 100, or remotely by the imaging service provider at a printing facility 170.

Figure 2:
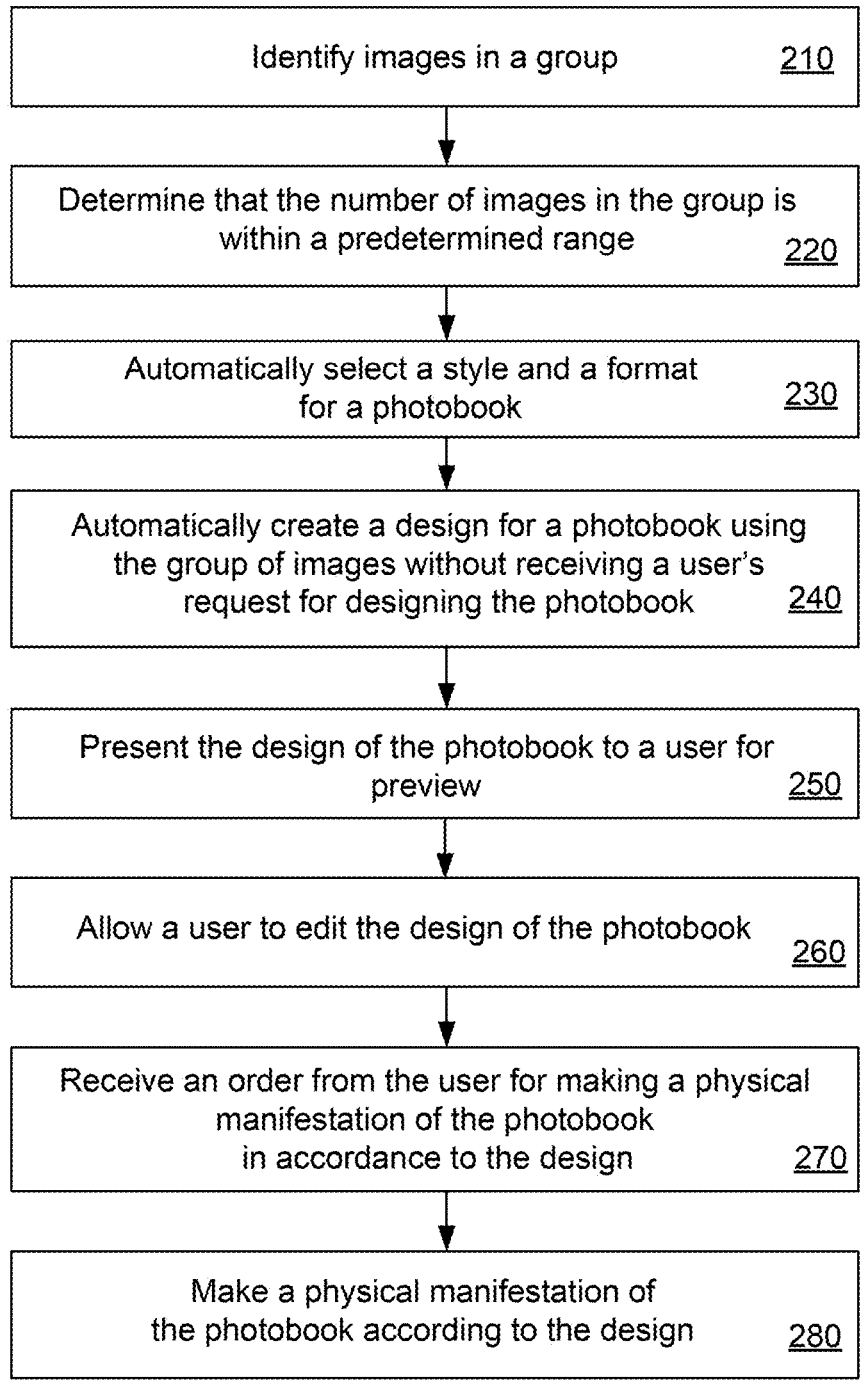
FIG. 2 shows a flow chart for proactively creating a photobook in accordance to the present invention.
Figure 3:
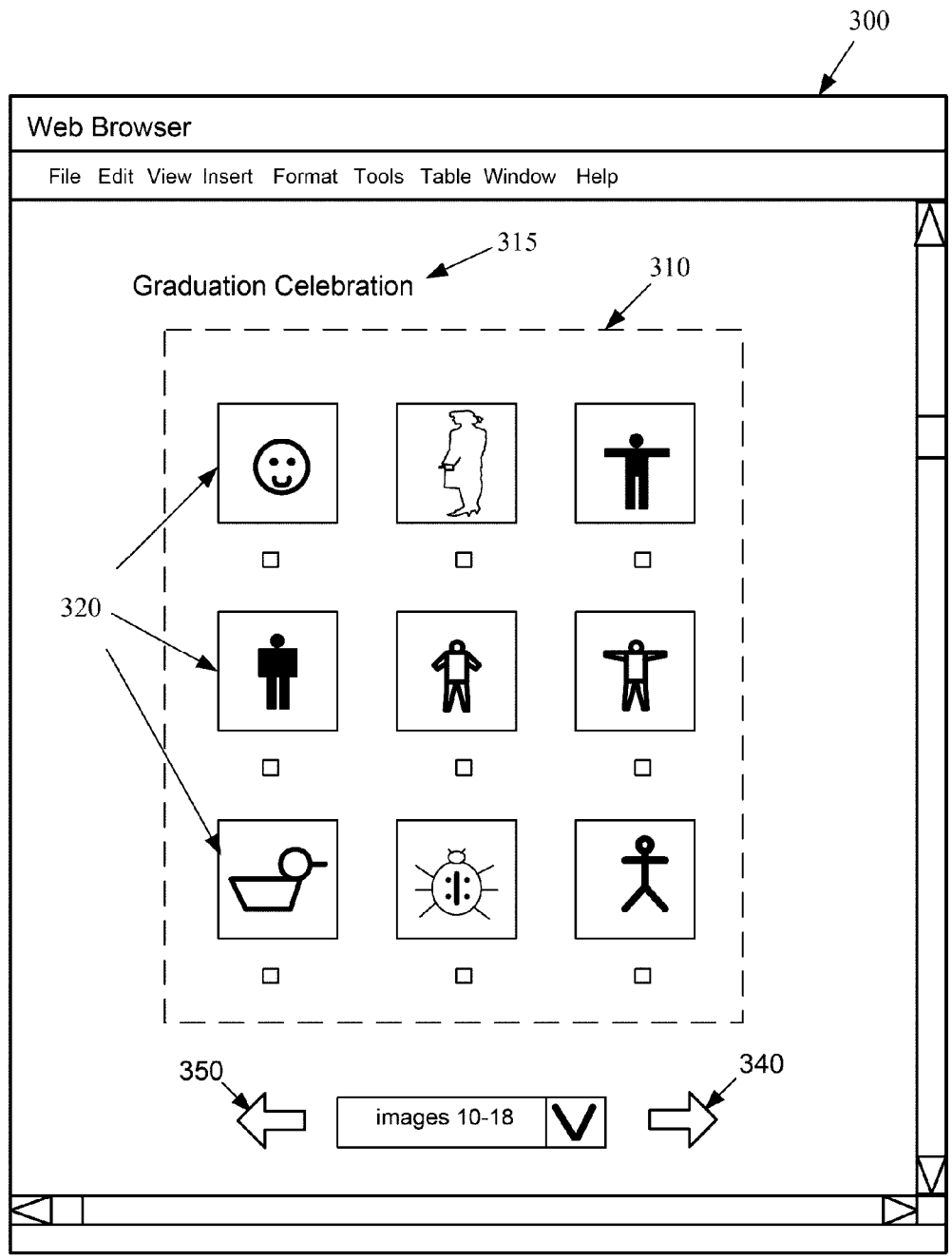
FIG. 3 is an exemplified user interface showing an image album having a plurality of images.

Referring to FIG. 2, a photobook can be made available to a user in the following general process. It should be noted that the process can include substeps within each step and other steps not shown in FIG. 2. A group of images are identified by a computer system such as the computer 100 or the server 170 (step 210). The images can be received in a group in an upload from a computer device (e.g. the computer 100, FIG. 1) to the computer system (e.g. the server 170, FIG. 1), or from a digital camera to a computer (e.g. the computer 100, FIG. 1). The images can form a group when the images are shared in an electronic message from a first user (e.g. operating the computer 100, FIG. 1) to a second user via a computer server (e.g. the server 170, FIG. 1). The images can be identified when a group of images are selected for printing. The images can also be identified when the images are placed in an electronic folder or an electronic album for an occasion or event, or simply for collecting pictures of a theme or interest (which can be called "a picture picker"). As shown in FIG. 3, a user interface 300 (e.g. a web browser) displays an image album 310 that can have an album name 315 such as "Graduation Celebration" and a plurality of images 320. The image album 310 can include several pages of images that a user can navigate to and view by clicking arrow buttons 340, 350. Furthermore, images may be tagged by a user or the service provider by labeled such as "Hawaiian Vacation", "Soccer Team", "Birthday Party", "Favorite", etc. A group of images can be identified when they are tagged by a common label such as "Hawaiian Vacation".

The computer system then determines if the number of images is within a predetermined range (step 220). For example, the threshold for the number of images in the group can be 20 (i.e. the predetermined range is 20 or higher). If the images in the group are within the predetermined range, the computer system automatically selects a style and a format for a photobook (step 230). The styles of photobooks can include, for example, romance, seasonal, every day, vacation, travel, wedding, baby, kids, birthday, school memories, sports, Mother's day, holiday, etc., each of which can include more detailed styles. A style of a photobook can specify a theme for the photobook such as colors, background themes, patterns, picture frames, text fonts, positions of the text, and images on the inner pages as well as covers of the photobook. The format of a photobook can include the size e.g. 5"×7", 8"×8", 12"×12" etc.), the paper stock materials for the pages and the cover, the type of binding, and the finish of the photobook.

In some embodiments, the predetermined range can depend on how the group of images is selected, whether they are selected for printing, or for electronic share, or placed in a single electronic folder or album, or received in an image upload, or tagged by a same label. For example, the threshold number can be 15 for the images that are selected for printing, and 20 for the images that are selected for electronic sharing. The different threshold image numbers for different image aggregation sources is based on the observation that users conducting different image operations often have different degrees of interests in seeing the design and making a physical image-based product such as a photobook. The above described flexibility in image threshold numbers can provide service best suitable to different segments of users.

The style and the format of the photobook can have default selections such as "everyday" for the photobook style and 8" by 8" hardcover for the photobook format. In some embodiments, the style and the format of the photobook can be selected based on knowledge of the images in the group. Specifically, an image property can be extracted from the group of identified images. For example, if the images are identified by a common tag label "Hawaii Vacation", a photobook style for vacation, or specifically for Hawaiian vacation, may be automatically selected. In another example, if the images identified are in an electronic album called "Molly's Birthday Party", a birthday photobook style can be automatically selected. In another example, the album name 315 (FIG. 3) in which the images (320, FIG. 3) are identified can be used to automatically select a photobook style (such as a "Graduation" photobook style).

The computer system automatically produces a design incorporating the identified images using the automatically selected photobook style and format (step 240). It should be noted that the photobook design using the group of identified images, and the associated selections of photobook style and formats, are proactively and automatically implemented by the computer system without receiving a request from a user. The approach described in the present systems and methods is different from conventional photobook creation processes wherein users initiate projects to design photobooks. As described above, conventional photobook-making methods require awareness and familiarity of the photobooks by the users. The projects of creating photobooks can be very time consuming.

Figure 4:
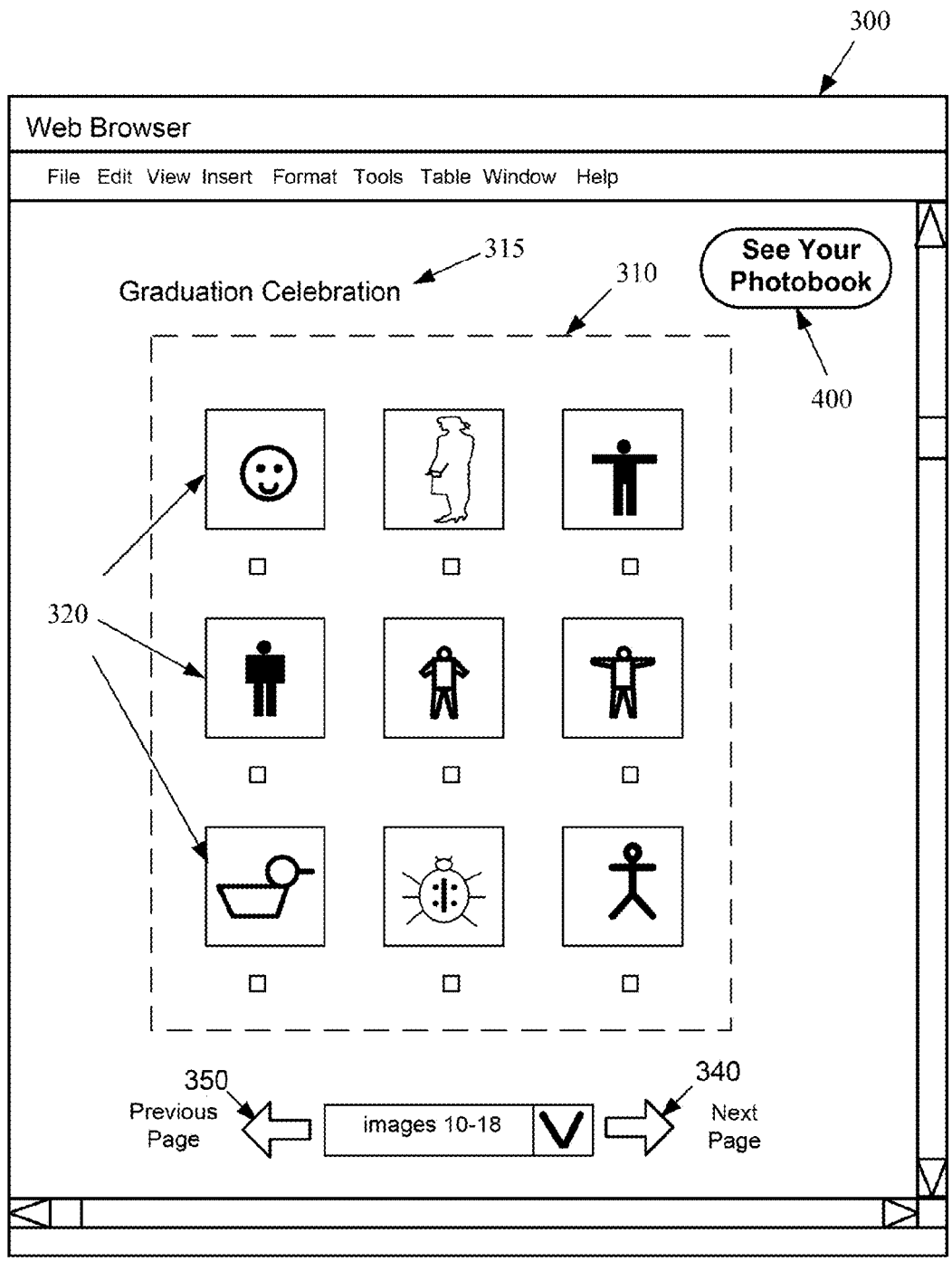
FIG. 4 is an exemplified user interface showing an image album having a plurality of images, and an indication that a photobook has been proactively created.
Figure 5A:
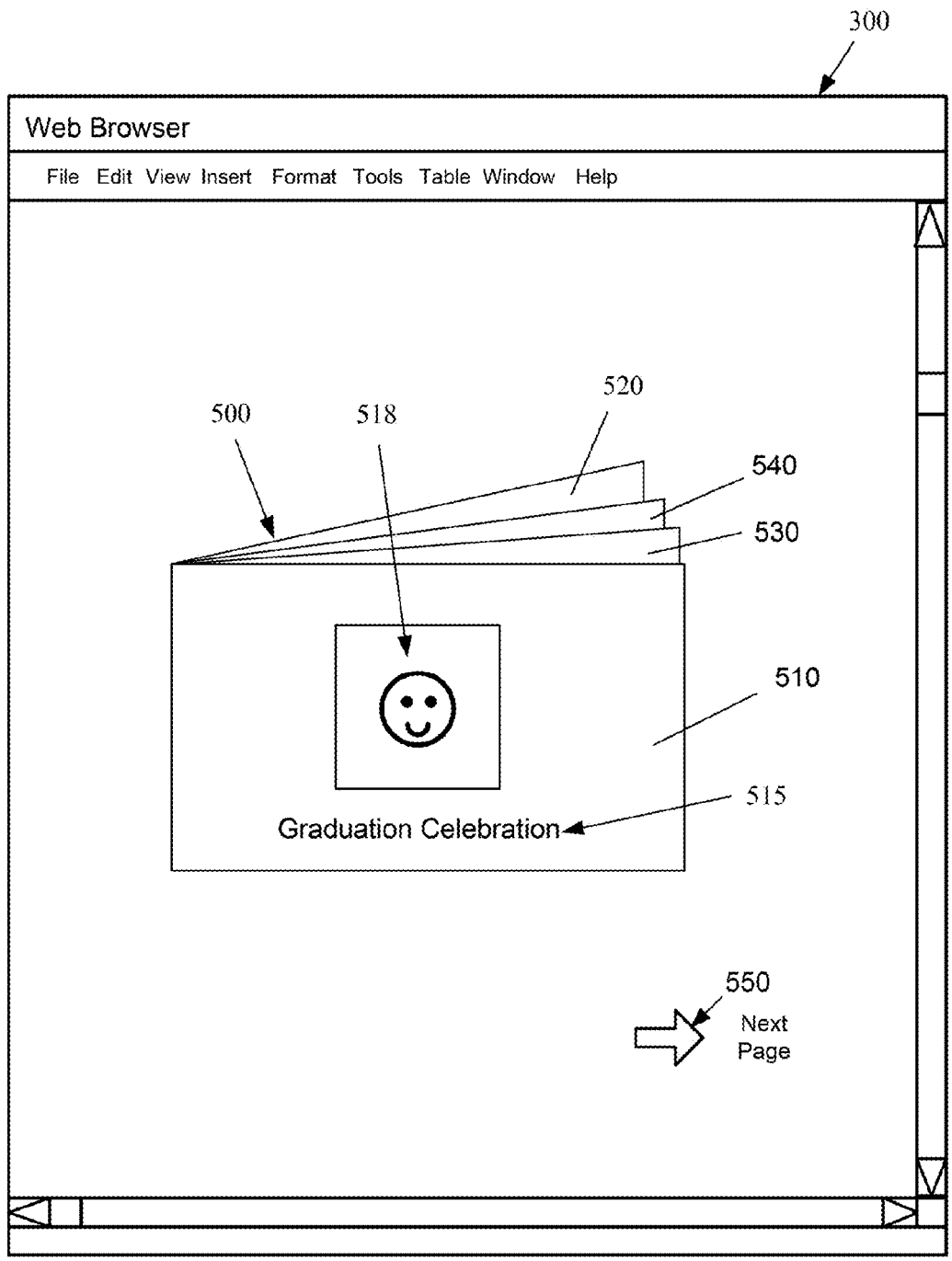
FIGS. 5A and 5B illustrate an exemplified user interface for showing a proactively created photobook.
Figure 5B:
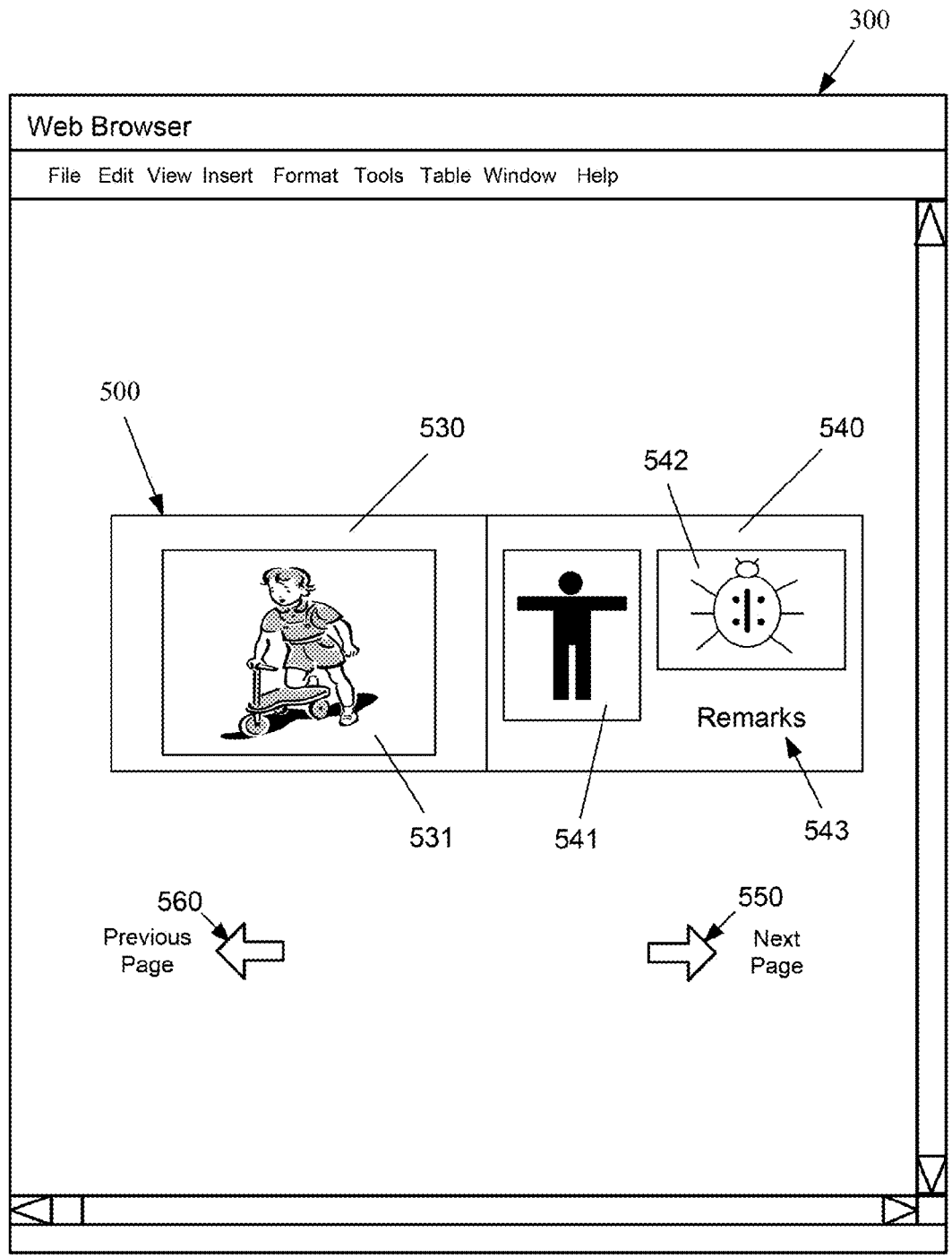

The proactively and automatically created design of the photobook can be presented by the computer system to a user for preview (step 250). As shown in FIG. 4, the user interface 300 can display a button 400 "See Your Photobook" to indicate that a photobook based on the images 320 in the image album 310 has been proactively created, and ready for the users view. A photobook design 500 is displayed in the user interface 300 after the user clicks the button 400, as shown in FIGS. 5A and 5B. The photobook can include a front cover 510, a back cover 520, and a plurality of pages 530, 540. The book title can be automatically selected from the name of the image album 310 (FIG. 3). The front cover 510 can include a book title 515 and an image 518 selected from the images 320 (FIG. 3). For example, the image 518 can be the first image in the album 310 or the image used (for a thumbnail image) to represent the image album 310. The page 530 can include an image 531. The page 540 can include images 541, 542, and text 543. The presentation of the photobook design 500 can include realistic illumination and texture to imitate effects of the materials in the selected book format.

The user can click arrow buttons 550, 560 to view different pages of the photobook. The cover and different pages of the photobook design 500 can also be played automatically like a slide show once the user clicks the button 400 (FIG. 4).

Optionally, the user is allowed to edit the photobook design 500 (step 260). The user can change, switch, or remove the images 518, 531, 541, and 542 on the book cover 510 and pages 530, 540. The user can also change text information such as the book cover 515 and the text 543. It should be noted that the photobook design 500 represents a complete design of a photobook that is ready to be ordered. The editing is an optional step depending on the user's time availability.

It should be understood that the proactively created photobook designs can be presented in many forms. As describe above, images identified to create a photobook design typically belong to a group, such as a group of shared images, posted images, uploaded images, or images selected for printing, etc. The proactively created photobook design is presented to the user at relevant places on the web pages, such as on a web page for confirming the share of the group of images, at a share web when the group of shared images are viewed, or at a page after a group of images have been ordered for printing. The image service provider can also proactively send an email to inform someone about the creation of the photobook design. For example, a user that just uploaded a group of images to the server managed by the image service provider may receive an email message from the service provider about the creation of the photobook design.

After the user has reviewed and optionally edited the photobook design 500, the user can save the photobook design 500 and order a physical manifestation of the photobook based on the to edit the photobook design 500 from the image service provider (step 270).

The image service provider can receive the order via the server 160 has a physical manifestation manufactured at the printing facility 170 according to the photobook design 500 (step 280).

Figure 6:
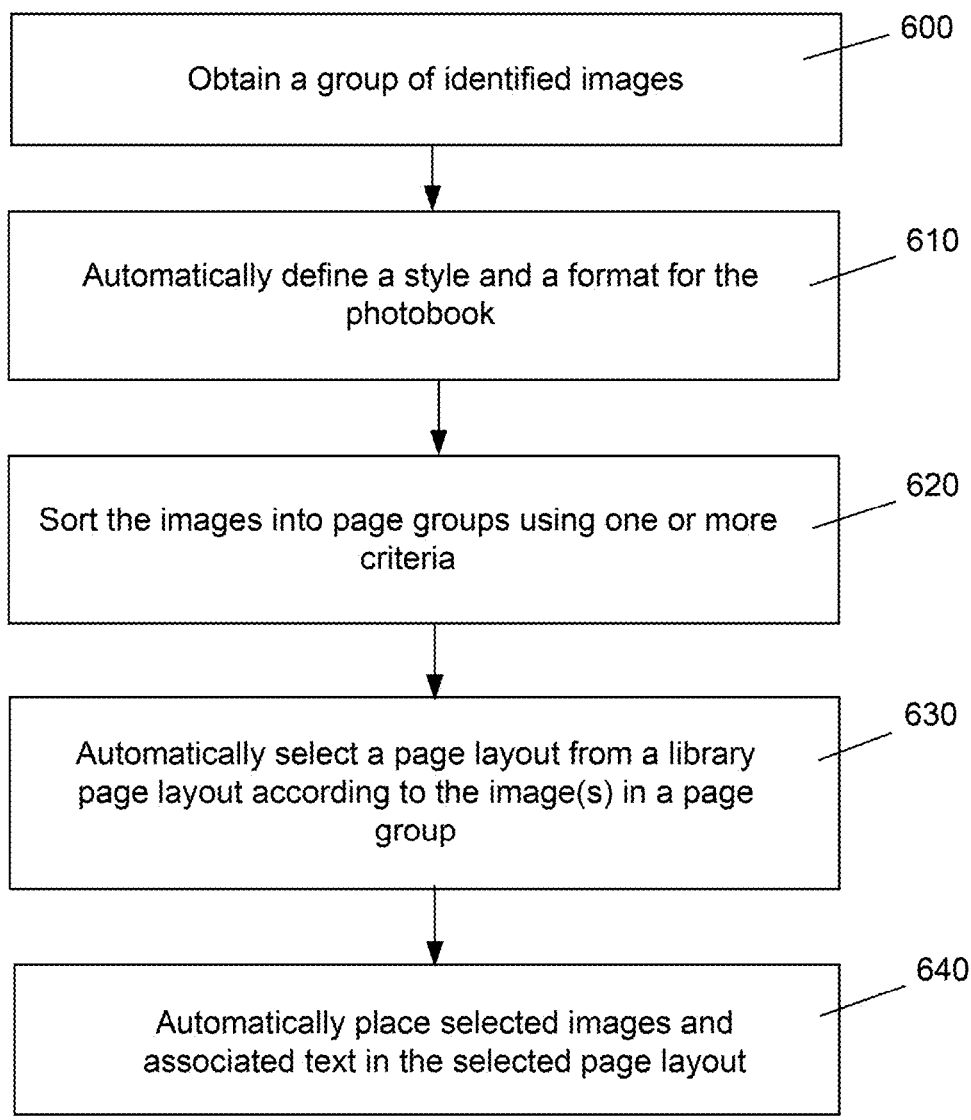
FIG. 6 shows a flow chart for proactively and automatically creating a design for a photobook in accordance to the present invention.
Figure 7:
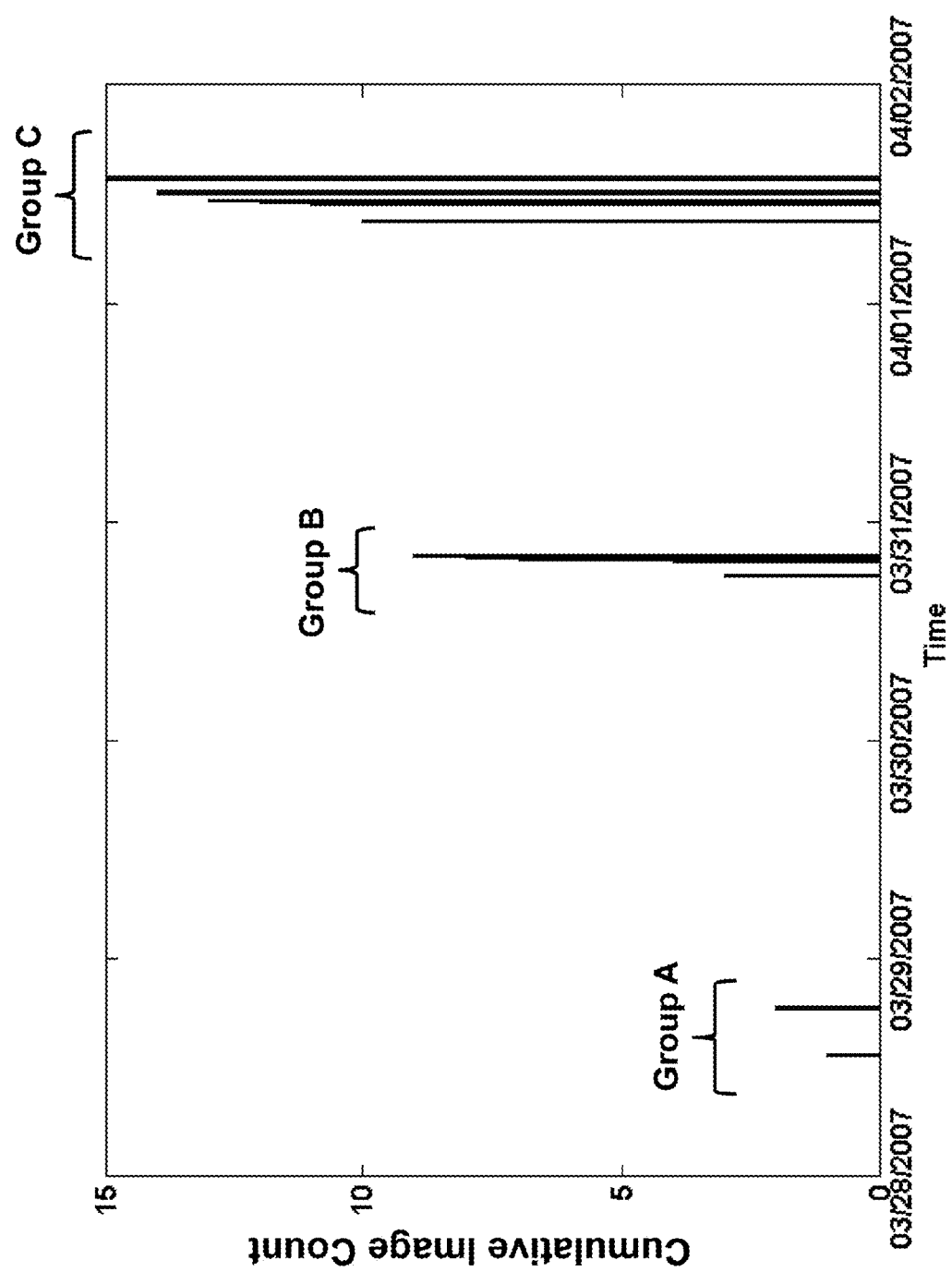
FIG. 7 illustrates sorting and grouping of images by image capture time in accordance to an aspect of the present application.

Details about the proactive design of a photobook (in steps 230-240, FIG. 2) are described below. Referring to FIG. 6, a group of images having numbers within a predetermined range are first obtained as described above by a computer system (step 600). A style and a format can be automatically selected for a photobook design (step 610). The images are sorted by one or more criteria to produce a desirable sequence that the images will be presented in a photo book (step 620). The criteria can include a primary criterion. For example, the images can be sorted by their associated image capture times. The image capture times can be extracted from the header information in the image files. For example, a JPEG image may include an EXIF header that includes the capture time of the image. It is stored by the digital camera in the image file as information in association with the image data. Referring to FIG. 7, a cumulative image count can be plotted against image capture time. In one implementation, the list of images can be sequenced chronically based on capture time of the images. Users often prefer to have images to appear in book pages in a chronological order. The images can be then separated into page groups using one or more secondary criteria. For example, images can be grouped according to capture time. Images captured in a short time interval are more likely suitable to be placed on the same page, facing pages, or adjacent pages in a photo book. In some embodiments, images that are taken in a short interval (e.g. a day) can be assigned to a same group (e.g. Group A, FIG. 7). The images in Group A, Group B, or Group C (FIG. 7) are captured in a short time interval. The images in each of these groups can be respectively grouped as candidates to appear on a same page, facing pages, or adjacent pages.

Figure 8:
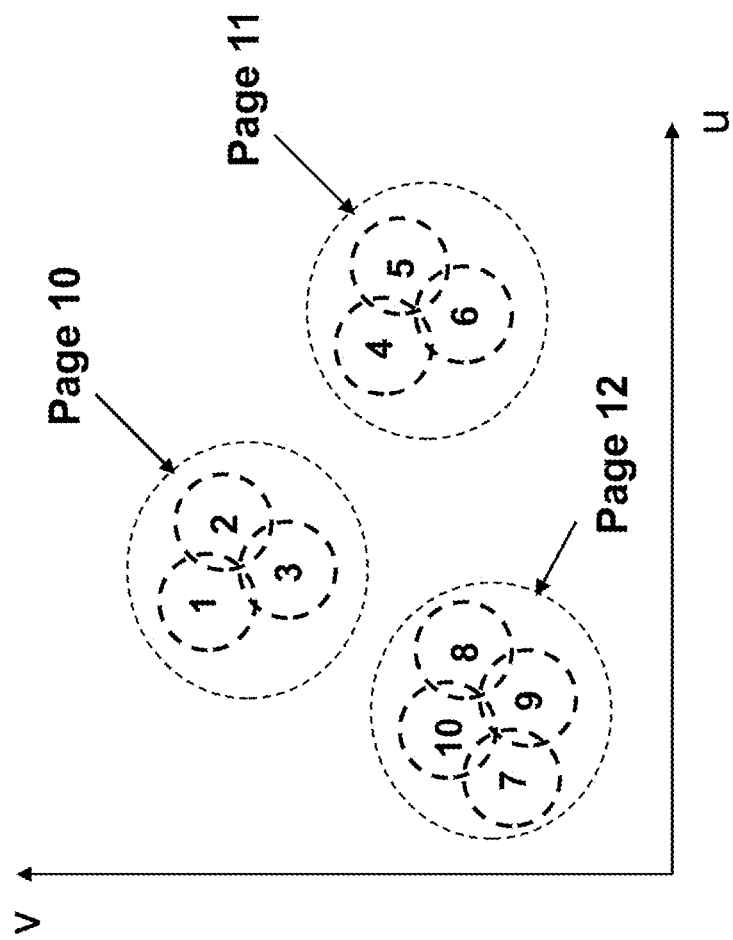
FIG. 8 illustrates sorting and grouping of images by image color content in accordance to another aspect of the present application.

The sorted images may be first placed into a group including a large number of images that do not fit on a page. For example, ten images in Group B (FIG. 7) are taken in a short time interval such a day. The images in Group B can be further separated into page groups using other secondary criteria such as color content and image capture locations. For instance, the most popular color of each of the ten images can be plotted in a color space (such as (Y, u, v), (L, a, b) etc.), as shown in FIG. 8. The color space is first separated into finite number of regions. The most popular color is defined as the color region that has the most pixel values that fall into. The ten images can be further sub-grouped according to their adjacencies in the color plane (u, v): images 1-3 may be categorized into a first group; images 4-6 may be categorized into a second group; images 7-10 may be categorized into a third group. The images 1-10 in Group A might have been taken within a same day. The photographer might have traveled to several different surroundings, such as a beach, a restaurant indoor, or a swimming pool at the hotel, each of which may have different color distributions. It should be understood that the display of color content distributions of images are not limited to a specific color coordinates or the two dimensional color plane shown in FIG. 8. The color distributions can be plotted in three dimensional color spaces (Y, u, v), (L, a, b), or two dimensional color planes such as (Y, u), (Y, v), (a, b), (L, a) etc. In some embodiments, the images with close distance in color space are intentionally separated across different pages in the photobook such as the images on a page will not look alike.

Figure 9:
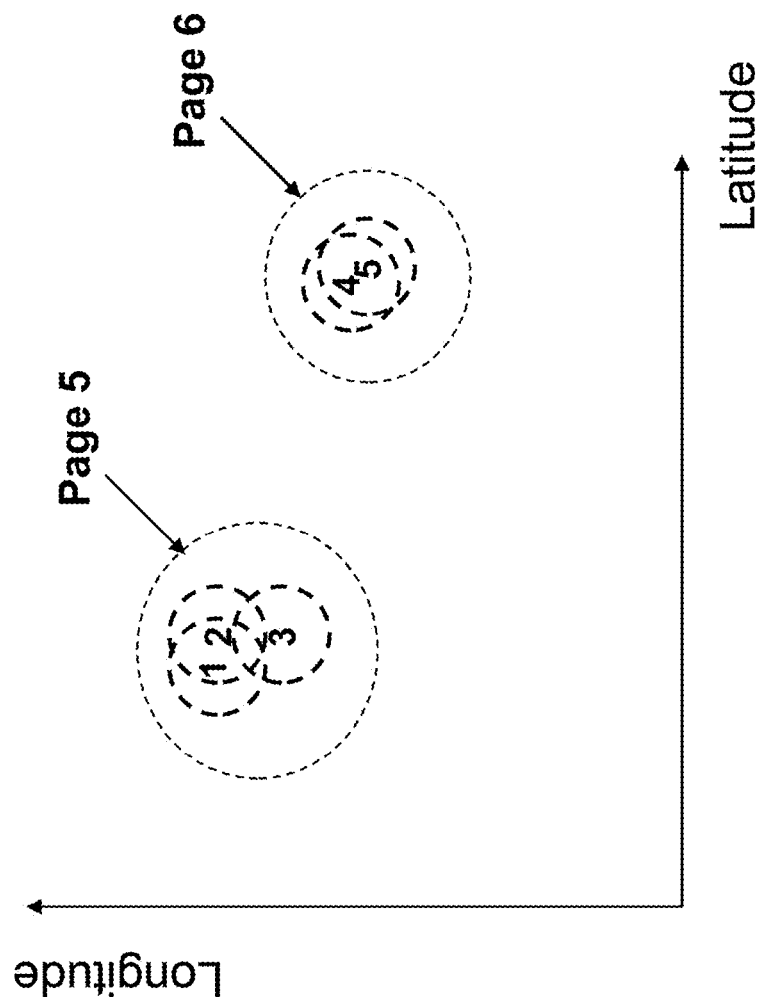
FIG. 9 illustrates sorting and grouping of images by image-capture location in accordance to another aspect of the present application.

In some embodiments, the images can be sorted or grouped based on geographic locations. For example, assuming Group C (FIG. 7) includes five images that are taken, for example, in a same day. Geo location information about each of the five images can be extracted from the header information of the five images, and plotted as shown in FIG. 9. Images 1-3 are shown to have been taken in close proximity while images 4-5 are taken at similar locations. Images 1-3 can be sub-grouped together and assigned to Page 4 of the photo book. Images 4-5 can be sub-grouped together and assigned to Page 5 of the photo book. In some embodiments, the Images 1-3 and the Images 4-5 can be assigned to be on facing pages (e.g. such as pages 4 and 5) such that the images from the same events can be viewed on facing pages in one open-book view. In some embodiments, the images with close geographic proximity are intentionally separated across different pages in the photobook such as the images on a page will not look alike. The placements of two page groups of images on facing pages can be based on one or more secondary criteria, such as image capture time, image color content, and image capture location.

A page layout is automatically selected from the library of page layouts in accordance with the properties of the images on the page as well as the text information associated with the image receiving areas in the page layout (step 630). The format of the image receiving field in the page layout matches the format of the selected image. For example, images in Group A (FIG. 7) may include two landscape images (L) and two portrait images (P). A notation for the image formats for Group A can be "LLPP". The page layout selected from the page-layout library should have four image receiving areas with matching image formats "LLPP".

The page layout also includes an image caption area positioned adjacent to the image receiving area for receiving the associated text information. For example, one portrait image and one landscape image may be selected for the next page. The portrait image has associated text information entered by the user and stored in conjunction with the portrait image. The landscape is not associated with any text information. In selecting a page layout, the disclosed system first select page layouts containing two image receiving areas, and then further selects page layouts that have include one portrait and one landscape image receiving areas. Additionally, the disclosed system further selects page layouts that include an image caption area in association with the portrait image receiving area. After the page layout is selected, the selected image(s) and associated text are automatically placed in the selected page layout (step 640). The placement of the selected image(s) and associated text can be done in a single step because they are pre-stored in an integrated data structure as described previously. The same steps can be repeated for fill the image fields and text fields in each page of a photo book. The user can select an image from the plurality of images to be used as part of the book cover. Details about arranging images in page layouts are disclosed in the above referenced commonly assigned U.S. patent application Ser. No. 12/406,873, titled "Smart photobook creation", the content of which is incorporated herein by reference.

Figure 10:
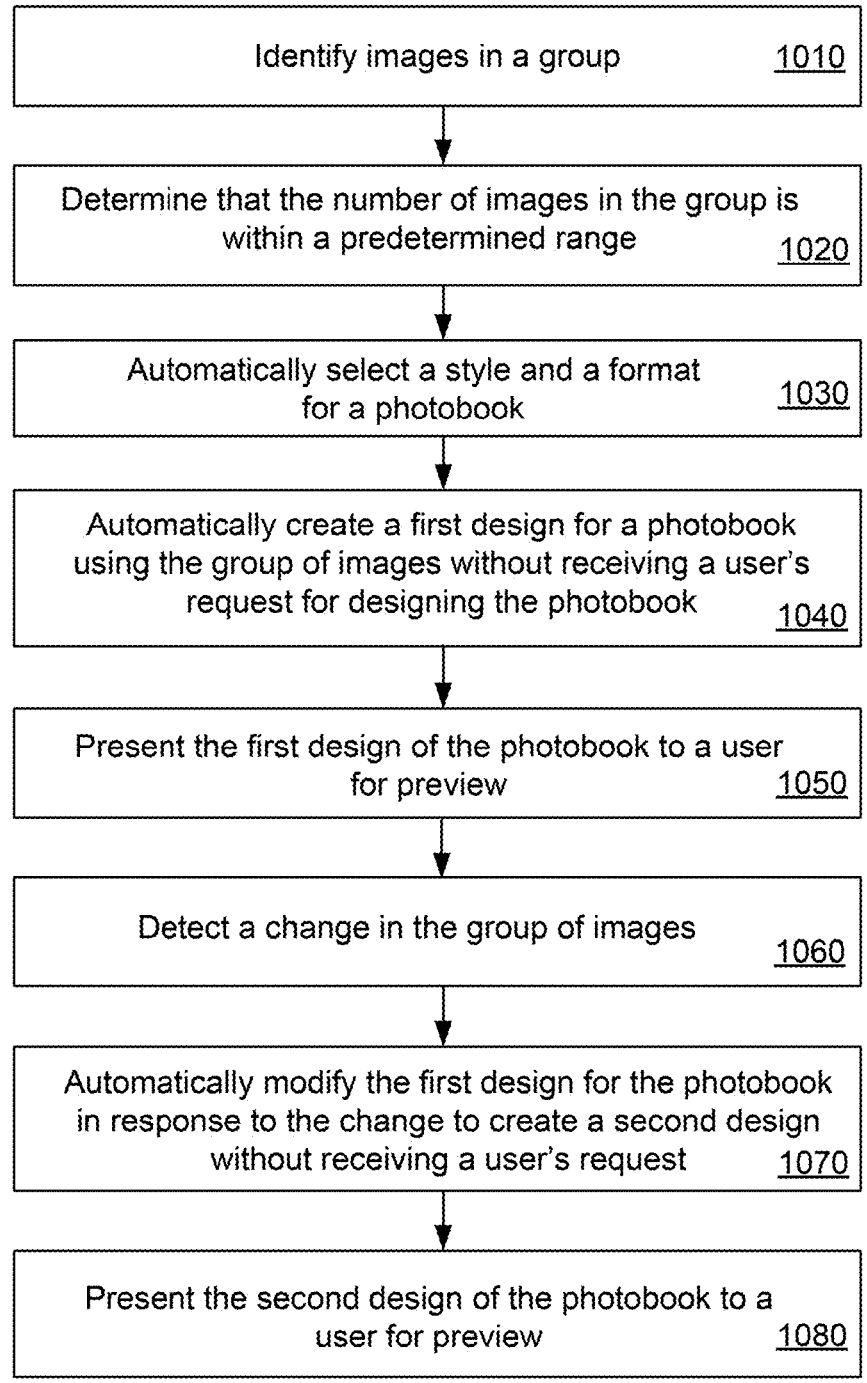
FIG. 10 shows a flow chart for proactively creating a photobook in accordance to another aspect of the present invention.

In some embodiments, the design of the photobook can be dynamically changed as the identified images change in the group. For example, the photobook design 500 can dynamically change as a user adds or removes images in and out of an image album (310, FIG. 3). The number of pages, the number of images per page, and the layout of images on the pages can automatically adapt to the changes to the images identified in the group. In general the process of updating photobook design can include the following steps: similar to the descriptions above in relation to steps 210-250 (FIG. 2), referring to FIG. 10, a group of images is first identified (step 1010). If the number of images in the identified group of images is determined to be in a predetermined range (step 1020), a style and a format are automatically selected for a photobook design (step 1030). A first design of a photobook is automatically created without receiving a request from a user (step 1040). The first design of the photobook is made available for the preview by a user (step 1050). When a change is detected in the group of identified images (step 1060), a second design of a photobook is automatically created without receiving a request from a user in response to the change detected in the group of images (step 1070). The change in the group of images can include addition to the group of images or removal of images from the group of images. The change in the group of images can also include a change in an image property of the group of images. The image property can include a tag, a keyword, a title of a folder where the images are placed, or metadata at least one of the images.

The second design of the photobook is subsequently presented for user's preview (step 1080). The change in the group of identified images can include addition, removal, a change in the sequence, addition of remarks and keywords, addition in change in tagging in a group of images. The uploading of images into an image folder/album can take more than one uploading events. The design of the photobook can be continually updated as new images are received by the image folder/album.

It should be understood that the library of page layout contains layouts with different numbers of images other than one, two, and three. For a given number of images on a page and for the given formats of the images, the page layout is not limited to the designs shown in this application. There can be a large variation of layout designs for the same number of images with the same formats on each page. Moreover, the sorting and grouping of images can be implemented by other approaches or using other metrics. The illustration of page grouping and page breaks for the images can also vary within the scope of the present disclosure. Moreover, the presently disclosed systems and methods are compatible with a software application installed locally on a computer device, client software in communication with a remote server, or a software application installed on a central server.

What is claimed is:

1. A computer system for proactively creating a photo product, comprising:
   one or more computer processors configured to identify a group of images and automatically determine if the number of images in the group is within a predetermined range,
   wherein the one or more computer processors are configured to automatically create a design for a photo product by the computer system without receiving a user's request for designing a photo product if the number of images in the group is determined to be within a predetermined range,
   wherein pages of the photo product incorporate a plurality of images in the group of images,
   wherein the one or more computer processors are configured to present the design of the photo product to a user for preview and to receive an order from the user for a physical manifestation of the photo product based on the design.

2. The computer system of claim 1, wherein the group of images are received from a computer device over a computer network.

3. The computer system of claim 1, wherein the group of images are formed in an electronic share from a first user to a second user.

4. The computer system of claim 1, wherein the group of images are clustered when they are selected for printing.

5. The computer system of claim 1, wherein the group of images are clustered when the images are placed in an electronic folder or an electronic album.

6. The computer system of claim 1, wherein the group of images are tagged by a common label.

7. The computer system of claim 1, wherein the one or more computer processors are configured to automatically select a format or a style for the design of the photo product before the step of automatically creating a design for a photo product by a computer system.

8. The computer system of claim 1, wherein the predetermined range varies depending on if the group of the images is clustered in an upload from a computer device to the computer system, or when the images are selected for printing, or when the images are placed in an electronic folder or an electronic album, or when the images are placed in an electronic folder or an electronic album, or the images are tagged by a common label.

9. The computer system of claim 1, wherein the step of automatically creating a design for a photo product comprises:
assigning at least a portion of the plurality of images into a first page group and a second page group each comprising one or more images;
placing the first page group of one or more images in the first page of the photo product; and
placing the second page group of one or more images in the second page of the photo product.

10. The computer system of claim 9, wherein the step of automatically creating a design for a photo product further comprises:
automatically selecting a first page layout from a library of page layouts, wherein the first page group of one or more images are placed in the first page according to the first page layout; and
automatically selecting a second page layout from the library of page layouts, wherein the second page group of one or more images are placed in the second page according to the second page layout.

11. The computer system of claim 9, wherein at least two of the plurality of images are separated into the first page group and the second page group based on capture times of the two images.

12. The computer system of claim 11, wherein the two images are placed on a same page if the two images were captured within a predetermined period of time.

13. The computer system of claim 11, wherein the two images are placed on different pages if the two images were captured within a predetermined period of time.

14. The computer system of claim 9, wherein at least two of the plurality of images are separated into the first page group and the second page group based on color content of the two images.

15. The computer system of claim 14, wherein the two images are placed on a same page if popular colors in the two images are within a predetermined distance in a color space.

16. The computer system of claim 14, wherein the two images are placed on a different page if popular colors in the two images are within a predetermined distance in a color space.

17. The computer system of claim 9, wherein at least two of the plurality of images are separated into the first page group and the second page group based on image-capture locations of the two images.

18. The computer system of claim 1, wherein the one or more computer processors are configured to allow the user to remove at least one image from the first page or to move an image from the first page to the second page after the step of presenting the design of the photo product.

19. The computer system of claim 1, wherein the one or more computer processors are configured to allow the user to select the format or the style for the design of the photo product page after the step of presenting the design of the photo product.

20. The computer system of claim 1, wherein the one or more computer processors are configured to enable the physical manifestation of the photo product manufactured in accordance to the design.

21. The computer system of claim 1, wherein the one or more computer processors are configured to send an email message to the user to present the design of the photo product.

22. The computer system of claim 1, wherein the one or more computer processors are configured to enable a display of the design of the photo product on a mobile device for the user's preview.

23. A computer system for proactively creating a photo product, comprising:
one or more computer processors configured to identify a group of images and automatically determine if the number of images in the group is within a predetermined range,
wherein the one or more computer processors are configured to automatically select a format and a style for a photo product by the computer system if the number of images in the group is determined to be within a predetermined range,
wherein the one or more computer processors are configured to automatically create a design for the photo product in the selected format and the style without receiving a user's request for designing a photo product using the group of images,
wherein pages of the photo product incorporates a plurality of images in the group, wherein the one or more computer processors are configured to present the design of the photo product to a user for preview and to receive an order from the user for a physical manifestation of the photo product based on the design.

24. The computer system of claim 23, wherein the one or more computer processors are configured to extract an image property from the group of images and to automatically select the format and the style according to the image property.

25. The computer system of claim 1, wherein the one or more computer processors are configured to enable a display of the design of the photo product on a mobile device for the user's preview.

* * * * *